United States Patent
Nakajima et al.

(10) Patent No.: US 8,240,439 B2
(45) Date of Patent: Aug. 14, 2012

(54) VEHICLE DAMPER OF VARIABLE DAMPING FORCE

(75) Inventors: Kiyoshi Nakajima, Saitama (JP); Tatsuhiro Tomari, Saitama (JP); Toru Sukigara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1099 days.

(21) Appl. No.: 12/151,548

(22) Filed: May 7, 2008

(65) Prior Publication Data

US 2008/0277217 A1    Nov. 13, 2008

(30) Foreign Application Priority Data

May 7, 2007    (JP) .................................. 2007-122613
Mar. 10, 2008    (JP) .................................. 2008-059820

(51) Int. Cl.
*F16F 9/00* (2006.01)
(52) U.S. Cl. ............... 188/313; 188/282.5; 188/322.15
(58) Field of Classification Search ............... 188/313, 188/267, 282.1–282.6, 283, 322.15, 314, 188/317
See application file for complete search history.

(56) References Cited

U.S. PATENT DOCUMENTS

| | | | | |
|---|---|---|---|---|
| 4,638,896 A | * | 1/1987 | Poyser ....................... | 188/266.2 |
| 4,673,067 A | * | 6/1987 | Munning et al. ........... | 188/266.4 |
| 5,657,840 A | * | 8/1997 | Lizell ........................ | 188/266.5 |
| 6,782,979 B1 | * | 8/2004 | Gold et al. ................. | 188/282.1 |

FOREIGN PATENT DOCUMENTS

| | | | |
|---|---|---|---|
| DE | 3704712 A1 | * | 8/1988 |
| EP | 0 572 040 A | | 12/1993 |
| EP | 1 202 868 B | | 8/2005 |
| JP | 57171133 A | * | 10/1982 |
| JP | 57-182506 | | 11/1982 |
| JP | 58106239 A | * | 6/1983 |
| JP | 01-47323 B | | 10/1989 |
| JP | 11-030265 A | | 2/1999 |
| JP | 11-051236 | | 2/1999 |
| JP | 2005-076752 A | | 3/2005 |
| JP | 2005-201398 A | | 7/2005 |

* cited by examiner

Primary Examiner — Robert A Siconolfi
Assistant Examiner — Mariano Sy
(74) Attorney, Agent, or Firm — Carrier Blackman & Associates, P.C.; Joseph P. Carrier; William D. Blackman (57) ABSTRACT

A vehicle damper of variable damping force including a cylinder, a piston and valves is disclosed. The valves have opening/closing parts and supporting parts. The opening/closing parts and the supporting parts are positioned separately so that a sufficient distance is obtained. Lengthening the distance from the supporting parts to the opening/closing parts makes it possible to reduce the opening and closing force of the opening/closing parts and to obtain highly responsive valves.

15 Claims, 9 Drawing Sheets

NON-ENERGIZED

FIG.6B

START OF ENERGIZATION

FIG.6C

ENERGIZED

VEHICLE DAMPER OF VARIABLE DAMPING FORCE

FIELD OF THE INVENTION

The present invention relates to a vehicle damper of variable damping force wherein valves disposed in a flow passage are opened and closed by magnetic attraction of an electromagnetic solenoid to thereby vary the damping force of the damper.

BACKGROUND OF THE INVENTION

In this type of damping force variable damper, oil flows through ports formed in a piston, and damping force is created by the resistance when the oil flows. To vary the damping force, it is common to vary the amount of oil flowing through the ports to change the damping force.

An example of this type of vehicle damper of variable damping force is a damper in which an electromagnet is used to suitably open and close the ports and the damping force of the damper is varied, as is disclosed in Japanese Patent Application Post-Exam Publication No. 1-47323 (JP 01-047323 B), for example.

The damper of variable damping force of JP 01-47323 B will be described below with reference to FIG. 10 hereof.

Figure 10:
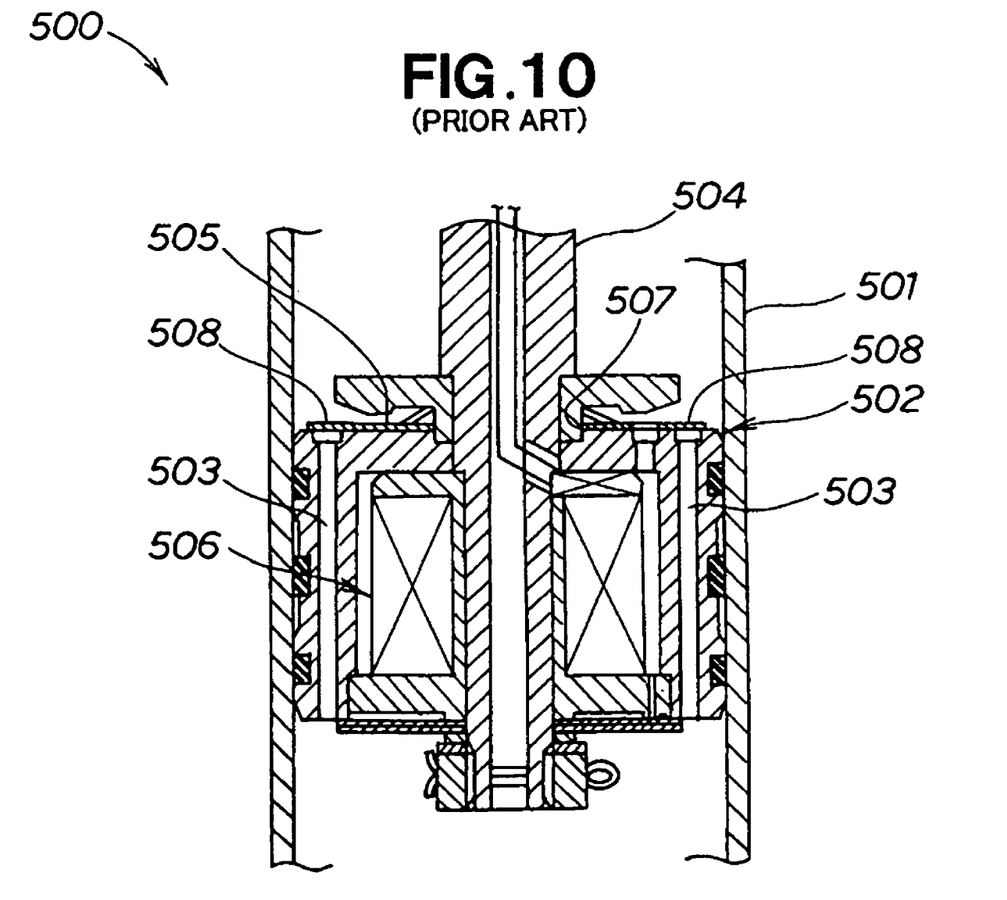
FIG. 10 is a cross-sectional view illustrating a conventional damper of variable damping force.

A conventional damper 500 of variable damping force shown in FIG. 10 is configured from a tubular cylinder 501, a piston 502 slidably mounted in the cylinder 501, damper oil (not shown) that flows through the interior of the cylinder 501 via a plurality of ports 503 formed in the piston 502, a rod 504 that is attached to the piston 502 at one end and that protrudes at the other end to the outside of the cylinder 501 via a rod guide (not shown), a valve 505 that is attached to the piston 502 coaxially with one end of the rod 504 and that opens and closes the ports 503, 503, and an electromagnetic solenoid (electromagnet) 506 provided to the piston 502 for driving the valve 505.

However, in the aforementioned damper 500, since the valve 505 is attached coaxially to the piston 502, it is impossible to obtain sufficient distance from a supporting part (fulcrum) 507 of the piston 502 to opening/closing parts (points of force) 508, 508 of the ports 503. Therefore, it has been difficult to impart flexible movement to the valve 505. Since the valve 505 is highly rigid, there have also been many cases in which force is needed to open and close the valve 505. Therefore, the valve 505 has had a slow response speed, and it has not been possible to appropriately control the valve 505. The valve 505 has also lacked durability because the valve 505 is highly rigid.

Furthermore, in the damper 500 of variable damping force, the opening/closing end of the valve 505 is separated from the piston 502 when the valve 505 is in an open state. To move the valve 505 from an open state to a closed state, a magnetic circuit is formed by the piston 502, the valve 505, and the electromagnetic solenoid 506 when an electric current is run through the electromagnetic solenoid 506. However, when the valve 505 is separated from the piston 502, the magnetic flux of the magnetic circuit has a smaller surface area than in cases in which the valve 505 is firmly affixed to the piston 502. Therefore, when the valve 505 is returned from the open state to the closed state against the flow of fluid (damper oil), there have been many cases in which sufficient return force cannot be created in the valve 505 and the responsiveness of the valve 505 is reduced.

SUMMARY OF THE INVENTION

It is therefore a first object of the present invention to obtain sufficient distance from supporting parts (fulcra) supported on a piston to opening/closing parts (points of force) for closing off or opening ports, and to reduce the opening and closing force of valves to improve responsiveness.

A second object of the present invention is to ensure a magnetic flux surface area for a magnetic circuit when the valves are in an open state, to enable the creation of sufficient return force in the valves, and to improve the responsiveness of the valves.

According to a first aspect of the present invention, there is provided a vehicle damper of variable damping force, which comprises: a tubular cylinder for accommodating damper oil; a piston housed in the cylinder and dividing the cylinder into two chambers; a pair of valves for controlling flow of the damper oil between the two chambers in correspondence with sliding movements of the piston; and an electromagnetic solenoid provided in the piston for open/close-driving the valves, wherein the valves have opening/closing parts for opening and closing a plurality of ports formed in the piston, and supporting parts for supporting the opening/closing parts in such a manner as to allow the opening/closing parts to make opening and closing actions, and the opening/closing parts and the supporting parts are provided in areas on opposite sides of a straight line passing diametrically of the piston.

Thus, opening/closing parts (points of force) and the supporting parts (fulcra) are separated, and the distance (span) between the two can be sufficiently lengthened. Durability of the valves can thereby be improved and highly responsive valves with reduced opening and closing force can be obtained. As a result, satisfactory control can be exerted over the damping force of the damper of variable damping force.

Furthermore, since a longer distance can be set between the opening/closing parts and the supporting parts and the opening and closing force of the valves can be reduced, less voltage is needed for the electromagnetic solenoid. As a result, the energy of the damper of variable damping force can be conserved.

Preferably, the valves are formed from circular plates having substantially the same diameter as the diameter of the piston. Therefore, the valves can be set to maximum dimensions. As a result, the durability of the valves can be further improved, and highly responsive valves with reduced opening and closing force can be obtained.

Desirably, the valves are formed from an elastic material and have arcuate slits formed along the external peripheries of the circular plates, annular parts formed between the slits and the external peripheral edges of the plates and fixed to the piston, the opening/closing parts, which are formed so as to open and close the ports on inner tongue parts that are located at portions farther radially inward than the arcuate slits, and the supporting parts, which are formed at portions where the inner tongue parts and the annular parts connect. Therefore, the valves can be fashioned with a simple structure, and the cost of the damper of variable damping force can be reduced.

In a preferred form, the valves are placed at ends of the piston and open/close the ports which are used exclusively for a damper extension stroke and a damper compression stroke, respectively. Therefore, the characteristics of the valves can be differed in the damper extension stroke and compressions stroke, and the damper characteristics can be varied.

In a desired form, the electromagnetic solenoid is provided to the interior of the piston so as to correspond to both the damper extension stroke and damper compression stroke. Therefore, precise control can be achieved when switching between the damper extension stroke and compressions stroke.

According to another aspect of the present invention, there is provided a vehicle damper of variable damping force, which damper comprises: a tubular cylinder for accommodating damper oil; a piston slidably housed in the cylinder for dividing the cylinder into two chambers; valves disposed in a part of a flow duct through which damper oil flows in association with a sliding movement of the piston, for controlling the flow of the damper oil; and an electromagnetic solenoid for driving the valves, wherein the valves have opening/closing parts for opening and closing a plurality of ports formed in the piston, supporting parts for openably/closably supporting the opening/closing parts, and magnetic flux delivery members for forming a magnetic circuit with the electromagnetic solenoid when the electromagnetic solenoid is energized while the opening/closing parts are in an open state and for delivering a magnetic flux to the valves.

Thus, a surface area is ensured for the magnetic surface even when the valves are in the open state, and sufficient return force can be generated in the valves. As a result, the responsiveness of the valves can be improved.

The valves and the electromagnetic solenoid are provided to the piston. Thus, the responsiveness of the single-cylinder damper can be improved.

Preferably, the cylinder comprises an inner cylinder in which the piston makes a sliding movement, and an outer cylinder disposed coaxially with and externally of the inner cylinder, and the valves and the electromagnetic solenoid are placed in communication ducts provided either at an end of the inner cylinder or between the inner cylinder and the outer cylinder. Thus, responsiveness of the valves can be improved in a multi-cylinder damper as well.

Desirably, the magnetic flux delivery member is disposed at a position that faces the opening/closing ends of the opening/closing parts when the opening/closing parts are in the open state. Therefore, a strong magnetic flux is created between the magnetic flux delivery member, the valves, and the piston when the valves are in the open state. As a result, highly responsive valve control can be achieved.

In a preferred form, the supporting parts are provided in the axial center of the piston. Therefore, the valves can be easily supported on the piston.

In a desired form, the supporting parts are provided in proximity to the external periphery of the piston. Therefore, a longer distance can be set between the opening/closing parts and the supporting parts in comparison with cases in which the supporting parts are provided in the axial center of the piston.

The opening/closing parts and the supporting parts may be provided in areas on opposite sides of a straight line passing diametrically of the piston. Thus, a longer distance (span) can be set (sufficiently worked) between the opening/closing parts (points of force) and the supporting parts (fulcra). The durability of the valves can be thereby improved and highly responsive valves with reduced opening and closing force can be obtained. As a result, satisfactory control can be exerted over the damping force of the vehicle damper of variable damping force.

BRIEF DESCRIPTION OF THE DRAWINGS

Certain preferred embodiments of the present invention will be described in detail below, by way of example only, with reference to the accompanying drawings, in which.

DESCRIPTION OF THE PREFERRED EMBODIMENTS

A damper of variable damping force according to a first embodiment of the present invention will now be described with reference to FIGS. 1 through 6.

Figure 1:
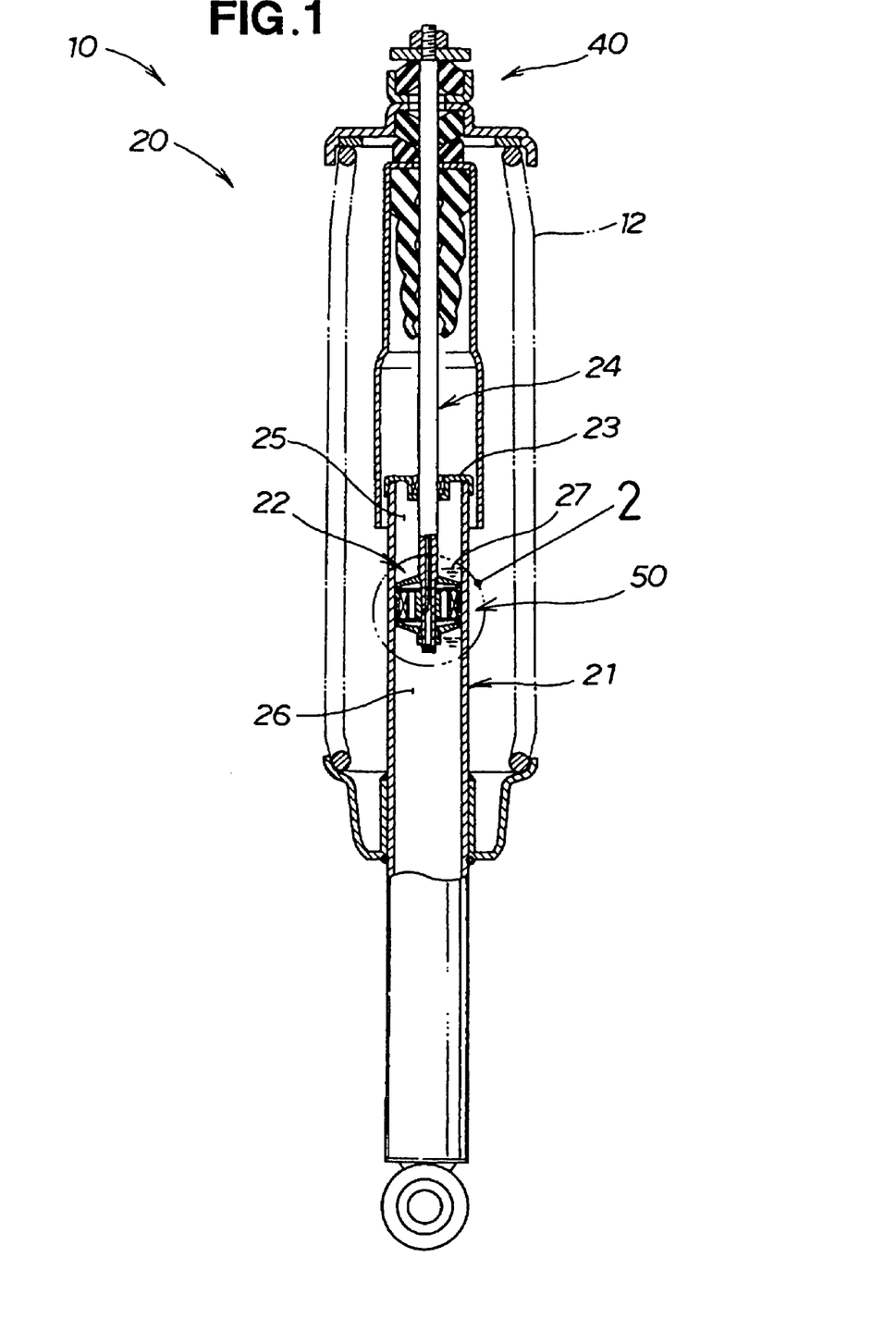
FIG. 1 is a cross-sectional view showing a damper unit employing a damper of variable damping force according to a first embodiment of the present invention.

A damper unit 10 is composed of a damper 20 of variable damping force (vehicle damper of variable damping force) and a coil spring 12, as shown in FIG. 1.

The damper 20 of variable damping force is composed of a tubular cylinder 21, a piston 22 that is slidably mounted within the cylinder 21 and that divides the cylinder 21 interior vertically into two chambers, a rod 24 that is attached to the piston 22 and that protrudes from one end of the cylinder 21 via a rod guide 23, and damper oil 27 that is hermetically sealed inside the cylinder 21 and that flows through the two chambers (upper chamber and lower chamber) 25, 26 via ports 75, 76 (see FIG. 2) in the piston 22, wherein the lower end of the damper is fixed to a suspension arm (not shown), and the upper end is fixed to a side of a vehicle body via an upper mount 40.

Figure 2:
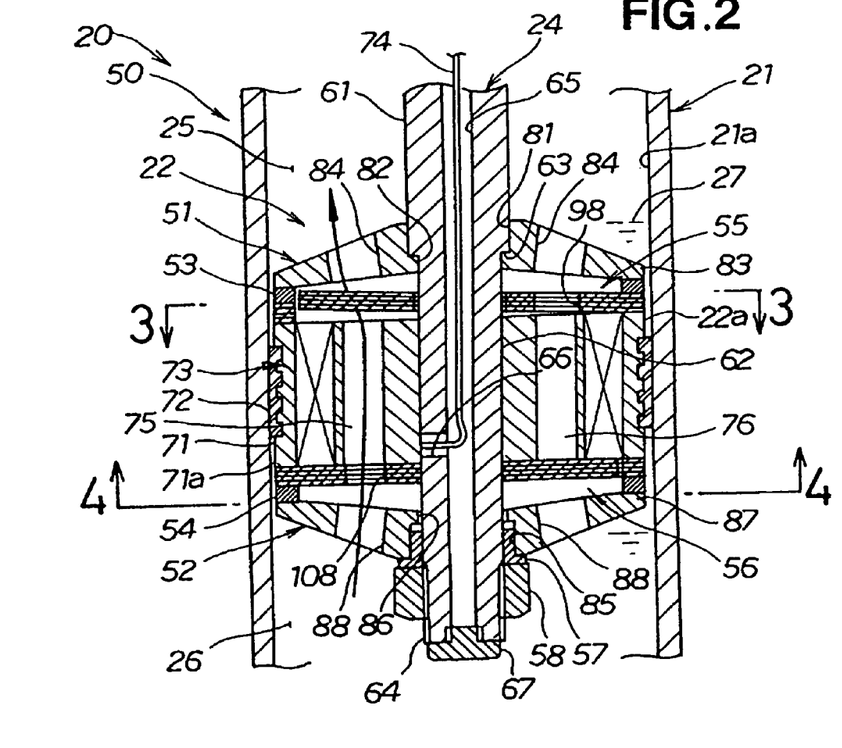
FIG. 2 is an enlarged view of section 2 of FIG. 1.
Figure 3:
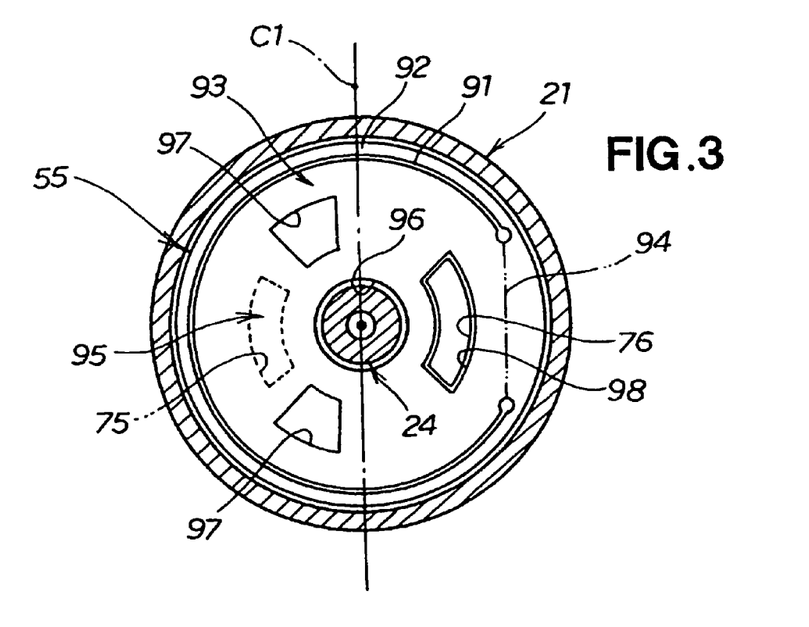
FIG. 3 is a cross-sectional view taken along line 3-3 of FIG. 2.
Figure 4:
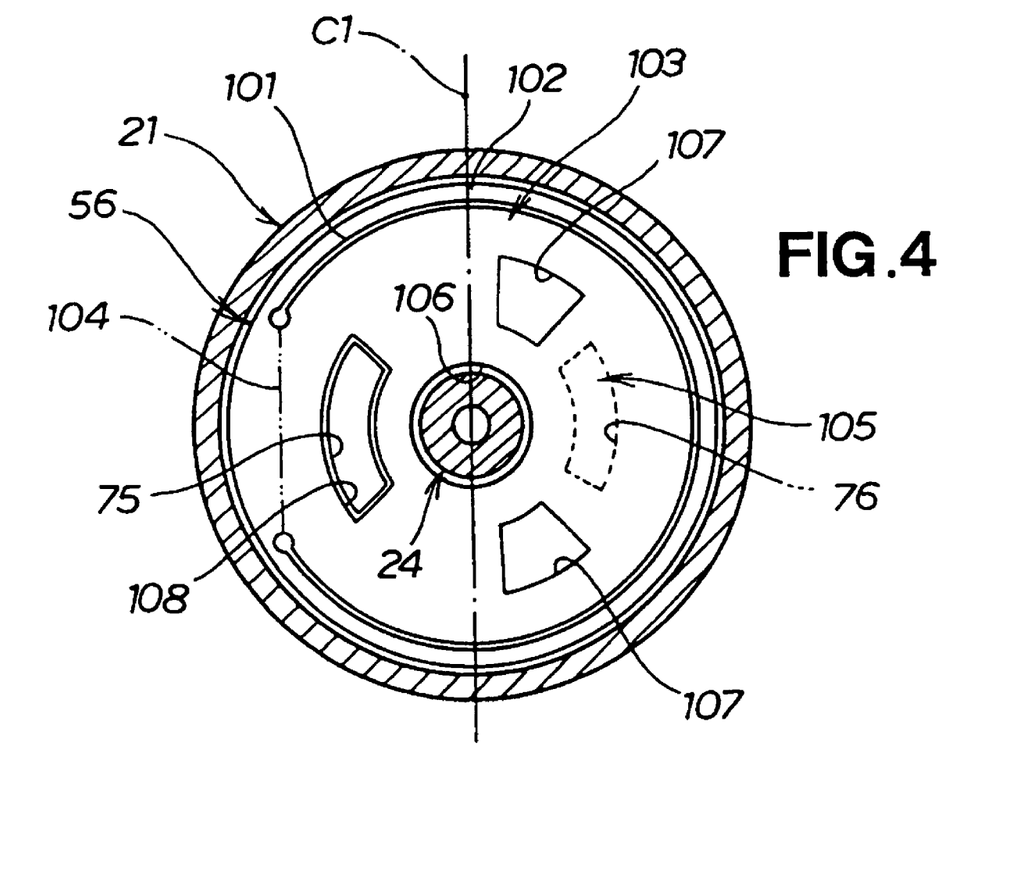
FIG. 4 is a cross-sectional view taken along line 4-4 of FIG. 2.

A piston assembly 50 is an assembly in which the piston 22 is attached by a nut 58 to a step 63 of the rod 24 via a collar member 57, as shown in FIGS. 2 through 4.

The piston assembly 50 is composed of an upper pushing member 51 that is run through the rod 24 and placed on the step 63 of the rod 24, a ring-shaped upper magnetic flux delivery member 53 disposed on the bottom of the upper pushing member 51, an upper valve 55 that is run through the rod 24 and that either allows or blocks the flow of damper oil 27, a piston 22 that is run through the rod 24 and that is formed from a magnetic substance, a lower valve 56 that is run through the rod 24 and that allows or blocks the flow of damper oil 27, a ring-shaped lower magnetic flux delivery member 54 disposed on the bottom surface of the lower valve 56, and a lower pushing member 52 that is run through the rod 24 and attached by a nut 58 to the rod 24 via the collar member 57.

The rod 24 is composed of a rod body 61; a small-diameter part 62 formed to be smaller in diameter than the rod body 61; a step 63 that is formed at the border between the small-diameter part 62 and the rod body 61 and that is in contact with the upper pushing member 51; an external screw 64 formed at the distal end of the small-diameter part 62, on which the nut 58 is threaded; a lead guiding hole 65 that opens in the axial direction in order to guide a lead wire 74 of an electromagnetic solenoid 73 to the exterior; a lead inlet hole 66 that opens into the small-diameter part 62 from the diameter direction so as to communicate with the lead guiding hole 65 in order to guide the lead wire 74 of the electromagnetic solenoid 73 to the interior; and a cap 67 for closing off the lower end of the lead guiding hole 65.

The piston 22 is composed of a piston body 71 formed from a magnetic substance; a seal member 72 that is attached to an external periphery 71a of the piston body 71, that slides through an internal periphery 21a of the cylinder 21, and that seals in the damper oil 27; the electromagnetic solenoid (electromagnet) 73, which is provided to the piston body 71 and which drives the upper and lower valves 55, 56; and the ports 75, 76, which are formed in the piston body 71 and which allow the damper oil 27 to flow in.

The upper pushing member 51 is supported on the upper magnetic flux delivery member 53. The upper pushing member 51 pushes an annular part 92 of the upper valve 55 in relation to the piston body 71, and lets the damper oil 27 through. The upper pushing member 51 has a through-hole 81 through which the small-diameter part 62 of the rod 24 passes, a ridge 82 that is formed in the periphery of the through-hole 81 and that fits with the step 63 of the rod 24, a pushing part 83 that pushes the upper valve 55 in relation to the piston body 71, and a plurality of fluid holes 84 through which the damper oil 27 passes.

The lower pushing member 52 has substantially the same structure as the upper pushing member 51. The lower pushing member 52 supports the lower magnetic flux delivery member 54, pushes an annular part 102 of the lower valve 56 in relation to the piston body 71, and lets the damper oil 27 through. The lower pushing member 52 has a through-hole 85 through which the small-diameter part 62 of the rod 24 passes, a ridge 86 that is formed in the periphery of the through-hole 85 and that faces the collar member 57, a pushing part 87 that pushes the lower valve 56 in relation to the piston body 71, and a plurality of fluid holes 88 through which the damper oil 27 passes.

The upper magnetic flux delivery member 53 is a ring-shaped member that supports the upper pushing member 51 and that is formed from a magnetic material in contact with the piston body 71. When an electric current is run through the electromagnetic solenoid 73 while the upper valve 55 is in an open state, a magnetic flux is formed by the piston body 71, the upper valve 55, and the upper magnetic flux delivery member 53, whereby the upper valve 55 is attracted to the piston body 71. As a result, the upper valve 55 generates sufficient return force, and the responsiveness of the upper valve is improved.

A hole, for example, is formed in the upper magnetic flux delivery member 53 and a boss is formed in the upper pushing member 51, whereby the upper pushing member 51 is supported.

The lower magnetic flux delivery member 54 is a member having the same configuration as the upper magnetic flux delivery member 53. The lower magnetic flux delivery member 54 is a ring-shaped member supported on the lower pushing member 52 and formed from a magnetic material in contact with the piston body 71. When an electric current is run through the electromagnetic solenoid 73 while the lower valve 56 is in an open state, a magnetic flux is formed by the piston body 71, the lower valve 56, and the lower magnetic flux delivery member 54, whereby the lower valve 56 is attracted to the piston body 71. As a result, the lower valve 56 generates sufficient return force, and the responsiveness of the lower valve is improved.

A hole, for example, is formed in the lower magnetic flux delivery member 54 and a boss is formed on the lower pushing member 52, whereby the lower pushing member 52 is supported.

The upper valve 55 is a circular plate composed of a magnetic and elastic material, as shown in FIG. 3. The upper valve 55 has an arcuate slit 91 formed substantially along the outside diameter of the circular plate, an annular part 92 formed around the external side of the slit 91 so as to fix to the piston body 71, an inner tongue part 93 formed around the internal side of the slit 91, and a supporting part (hinge) 94 formed in the portion where the annular part 92 and the inner tongue part 93 join.

An opening/closing part 95, which is part of the inner tongue part 93, and the supporting part 94 are positioned to the left and right sides of a straight line C1 passing through the diameter of the piston 22.

The inner tongue part 93 has the opening/closing part 95 which opens and closes the port 75, a rod through a hole 96 formed to be larger in diameter than the rod 24 to allow the rod 24 to pass through, oil outflow holes 97, 97 for allowing the damper oil 27 to flow out when the port 75 is opened, and an oil inflow hole 98 for allowing the damper oil 27 to flow into the port 76.

The opening/closing part 95 is a portion where part of the area of the inner tongue part 93 covers up the position corresponding to the port 75.

The oil outflow holes 97, 97 and the port 75 have a positional relationship in which they are misaligned from each other in a plan view. The oil inflow hole 98 and the port 76 have a relationship of being in the same position in a plan view.

The upper valve 55 is formed with the annular part 92, the inner tongue part 93, and the supporting part 94 in a state of being linked together. This makes it possible for the electromagnetic solenoid 73 to achieve sufficient attraction force without blocking the magnetic flux from the electromagnetic solenoid 73, even if the slit 91 is provided.

The lower valve 56 has the same material and shape as the upper valve 55, as shown in FIG. 4. The lower valve 56 has an arcuate slit 101, an annular part 102, an inner tongue part 103, and a supporting part (hinge) 104.

An opening/closing part 105, which forms part of the inner tongue part 103, and the supporting part 104 are positioned to the left and right sides of a straight line C1 running through the diameter of the piston 22.

The inner tongue part 103 has the opening/closing part 105, a rod through-hole 106, oil outflow holes 107, 107 for allowing the damper oil 27 to flow out when the port 76 is opened, and an oil inflow hole 108 for allowing the damper oil 27 to flow into the port 75.

The opening/closing part 105 is a portion where part of the area of the inner tongue part 103 covers up the position corresponding to the port 76.

The oil outflow holes 107, 107 and the port 76 have a positional relationship in which they are misaligned from each other in a plan view, and the oil inflow hole 108 and the port 76 have a relationship of being in the same position in a plan view.

Turning back to FIG. 2, the collar member 57 is designed to allow the small-diameter part 62 of the rod 24 to pass through the collar member 57. The collar member 57 is fitted into the through-hole 85 in the lower pushing member 52.

The damper 20 of variable damping force closes or opens the valve 55 by exciting (running an electric current through) or de-exciting (stopping the electric current through) the electromagnetic solenoid, and controls the flow of the damper oil 27 to control the damping force of the damper.

Since the opening/closing part 95 and supporting part 94 of the valve 55 are positioned on the left and right sides of the straight line running through the diameter of the piston 22, a long distance can be set between the opening/closing part (point of force) 95 and the supporting part (fulcrum) 94. The durability of the valve 55 can thereby be improved, and a highly responsive valve 55 having reduced opening and closing force can be obtained. As a result, satisfactory control can be exerted over the damping force of the damper 20 of variable damping force.

Furthermore, since a long distance can be set between the opening/closing part (point of force) 95 and the supporting part (fulcrum) 94 and the opening and closing force can be reduced, the electromagnetic solenoid 73 requires less electric power, and the energy of the damper 20 of variable damping force can be conserved.

Since the valve 55 is formed from a circular plate having substantially the same diameter as the diameter of the piston 22, the valve 55 can be set to maximum dimensions in accordance with the size of the piston 22. As a result, the durability of the valve 55 can be further improved, and a highly responsive valve with reduced opening and closing force can be achieved.

Since the valve 55 has a structure in which a plurality of elastic plates are stacked, the valve has a simple structure, and the cost of the damper 20 of variable damping force can be reduced.

As described above, the damper 20 of variable damping force comprises a tubular cylinder 21 for accommodating the damper oil 27; a piston 22 that is slidably accommodated within the cylinder 21 and that divides the cylinder 21 into two chambers 25, 26; valves 55, 56 that are disposed in part of the flow ducts through which the damper oil 27 flows due to the sliding action of the piston 22, and that control the flow of damper oil 27; and an electromagnetic solenoid 73 for driving the valves 55, 56. The valves 55, 56 have opening/closing parts 95, 105 for opening and closing the ports 75, 76 in the piston 22, and supporting parts 94, 104 for openably and closably supporting the opening/closing parts 95, 105.

When an electric current is run through the electromagnetic solenoid 73 while the opening/closing parts 95, 105 are in an open state, since magnetic circuits are formed between the valves 55, 56 and the piston 22 (electromagnetic solenoid 73) and the valves 55, 56 are provided with magnetic flux delivery members 53, 54 for delivering the magnetic fluxes, the magnetic circuits are ensured even when the valves 55, 56 are in the open state, and sufficient return force can be generated in the valves 55, 56. As a result, the responsiveness of the valves 55, 56 can be improved.

Responsiveness of the single-cylinder damper can be improved by disposing the valves 55, 56 and the electromagnetic solenoid 73 on the piston 22.

With the damper 20 of variable damping force, since the magnetic flux delivery members 53, 54 are disposed at positions that face the opening and closing ends of the opening/closing parts 95, 105 while the opening/closing parts 95, 105 are in the open state, strong magnetic fluxes can be generated between the magnetic flux delivery members 53, 54, the valves 55, 56, and the piston 22 (electromagnetic solenoid 73) when the valves 55, 56 are in the open state. As a result, responsive valve control can be achieved.

With the damper 20 of variable damping force, since the supporting parts 94, 104 are provided near the external periphery 22a of the piston 22 as shown in FIGS. 2 through 4, a longer distance can be set between the opening/closing parts 95, 105 and the supporting parts 94, 104 in comparison with, e.g., a case in which the supporting parts are provided at the center of the piston.

In the damper 20 of variable damping force, the opening/closing parts 95, 105 and the supporting parts 94, 104 are positioned on the left and right sides of straight lines C1, C1 running through the diameter of the piston 22. Specifically, a long distance (span) can be set (sufficiently worked) between the opening/closing parts (points of force) 95, 105 and the supporting parts (fulcra) 94, 104. The durability of the valves 55, 56 can thereby be improved and highly responsive valves 55, 56 with reduced opening and closing force can be obtained. As a result, satisfactory control can be exerted over the damping force of the damper 20 of variable damping force.

Figure 5A:
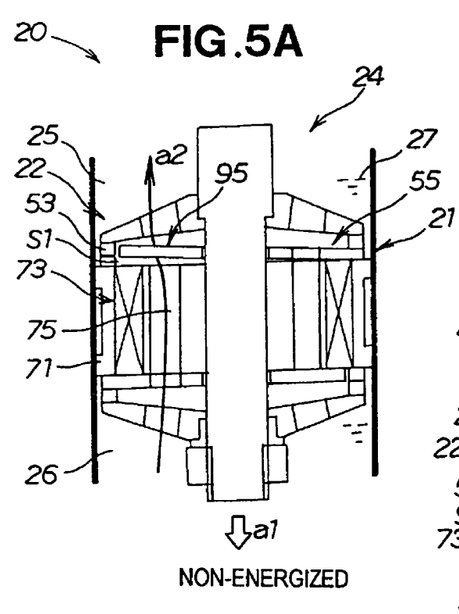
FIGS. 5A through 5C are schematic views illustrating an action or movement of a piston of the damper of variable damping force shown in FIG. 2 by a downward force applied thereto (damper compression stroke)
Figure 5B:
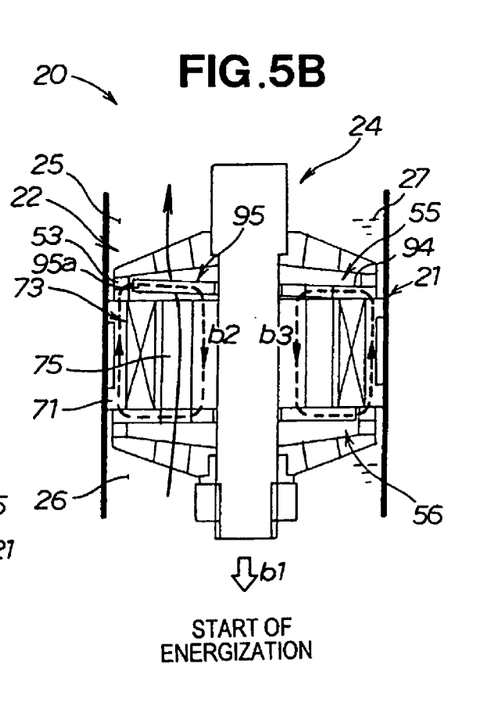
Figure 5C:
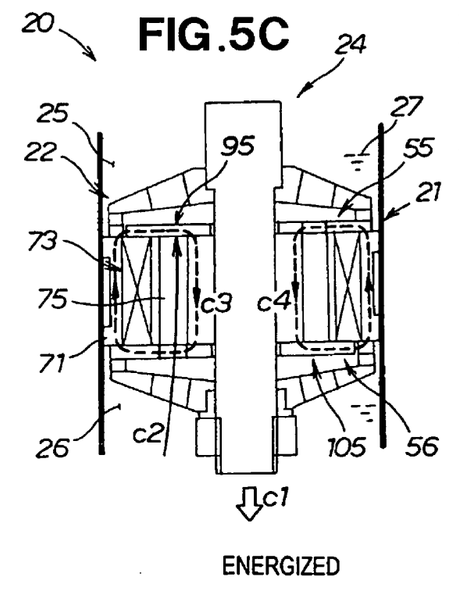

FIGS. 5A through 5C show the action in a case (damper compression stroke) in which the piston of the damper of variable damping force of FIG. 1 is subjected to downward force. FIG. 5A shows the damper 20 of variable damping force when no electric current is run through while the upper valve 55 is in the open state. FIG. 5B shows the damper of variable damping force when an electric current begins to be run through the electromagnetic solenoid 73 while the upper valve 55 is in the open state. FIG. 5C shows the damper 20 of variable damping force when an electric current is being run through the upper valve 55.

In FIG. 5A, when the piston 22 is subjected to a downward force as shown by arrow a1, the damper oil 27 attempts to move from the lower chamber 26 into the upper chamber 25 via the port 75. Since the electromagnetic solenoid 73 is non-energized, that is, has no electrical current, the pressure of the damper oil 27 causes the opening/closing part 95 of the upper valve 55 to be in the open state. The damper oil 27 moves from the lower chamber 26 to the upper chamber 25 as shown by the arrow a2, via a gap S1 created between the piston body 71 and the opening/closing part 95.

In FIG. 5B, when energization to the electromagnetic solenoid 73 is started while the piston 22 is moving downward as shown by arrow b1, a magnetic circuit (closed circuit) is formed as shown by arrow b2 by the piston 22 (piston body 71) and the lower valve 56 via the magnetic flux delivery member 53 in the opening/closing end 95a of the opening/closing part 95 of the upper valve 55, and sufficient attraction force is created in the electromagnetic solenoid 73.

A magnetic circuit is also formed in the vicinity of the supporting part 94 of the upper valve 55 by the upper valve 55, the piston 22 (piston body 71), and the lower valve 56, as shown by arrow b3.

In FIG. 5C, when the piston 22 is similarly subjected to downward force as shown by arrow c1, since the electromagnetic solenoid 73 is energized, the opening/closing part 95 is attracted to the piston body 71 to close the upper valve 55, and the damper oil 27 is prevented from moving from the lower chamber 26 to the upper chamber 25 as shown by arrow c2. The opening/closing part 105 of the lower valve 56 is similarly attracted to the piston body 71.

The piston body 71 and the upper and lower valves 55, 56 cause the magnetic circuit to become a closed circuit as shown by arrows c3, c4.

Figure 6A:
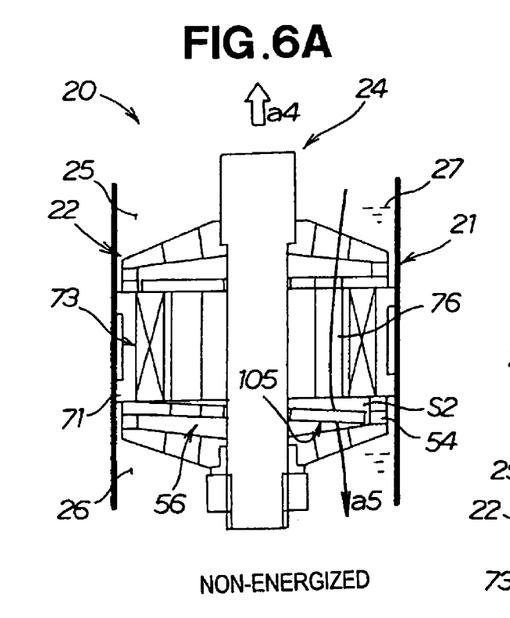
FIGS. 6A through 6C are schematic views illustrating an action or movement of the piston of the damping force variable damper shown in FIG. 2 by an upward force applied thereto (damper extension stroke)
Figure 6B:
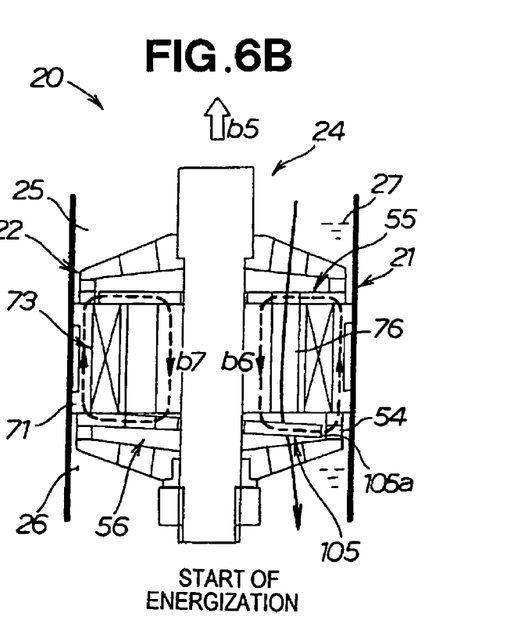
Figure 6C:
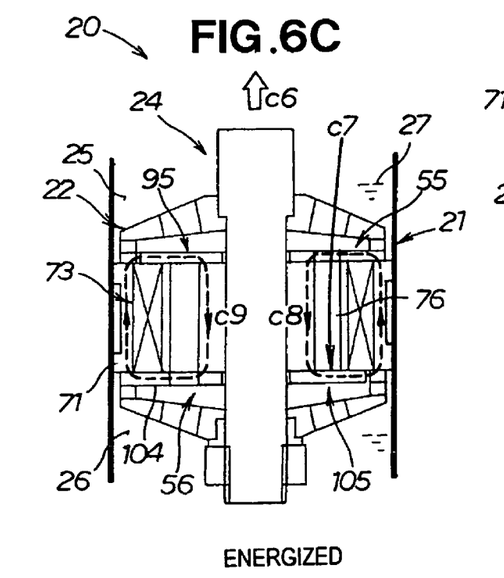

FIGS. 6A through 6C show the action in a case (damper extension stroke) in which the piston of the damper of variable damping force shown in FIG. 1 is subjected to upward force. FIG. 6A shows the damper 20 of variable damping force when no electric current is run through (non-energized) while the lower valve 56 is in the open state. FIG. 6B shows the damper 20 of variable damping force when an electric current begins to be run through the electromagnetic solenoid 73 while the lower valve 56 is in the open state. FIG. 6C shows the damping force variable damper 20 when an electric current is being run through the lower valve 56, which is in the closed state.

In FIG. 6A, when the piston 22 is subjected to upward force as shown by arrow a4, the damper oil 27 attempts to move from the upper chamber 25 into the lower chamber 26 via the port 75. Since the electromagnetic solenoid 73 has no electric current, the pressure of the damper oil 27 causes the opening/closing part 105 of the lower valve 56 to be in the open state. The damper oil 27 moves from the upper chamber 25 to the lower chamber 26 as shown by the arrow a5, via a gap S2 created between the piston body 71 and the opening/closing part 105.

In FIG. 6B, when an electric current begins to be run through the electromagnetic solenoid 73 while the piston 22 is moving upward as shown by the arrow b5, a magnetic circuit (closed circuit) is formed as shown by the arrow b6 by the piston body 71 and the upper valve 55 via the magnetic flux delivery member 54 in the opening/closing end 105a of the opening/closing part 105 of the lower valve 56, and sufficient attraction force is created in the electromagnetic solenoid 73.

A magnetic circuit is also formed in the vicinity of the supporting part 104 of the lower valve 56 by the lower valve 56, the piston body 71, and the upper valve 55, as shown by the arrow b7.

In FIG. 6C, when the piston 22 is similarly subjected to upward force as shown by the arrow c6, since the electromagnetic solenoid 73 is energized, the opening/closing part 105 is attracted to the piston body 71 to close the lower valve 56, and the damper oil 27 is prevented from moving from the upper chamber 25 to the lower chamber 26 as shown by the arrow c7. The opening/closing part 95 of the upper valve 55 is similarly attracted to the piston body 71.

The piston body 71 and the upper and lower valves 55, 56 cause the magnetic circuit to be formed as shown by the arrows c8, c9.

As is clear from FIGS. 5A through 5C and FIGS. 6A through 6C, the damper 20 of variable damping force has valves 55, 56 placed at both ends of the piston 22, and the respective dedicated ports 75, 76 are opened and closed in the damper extension (pulling) step and the damper compression (pushing) step. The characteristics of the respective valves 55, 56 can thereby be set in the damper extension and compressions strokes. Specifically, the characteristics of the valves 55, 56 can be varied by varying the number of stacked elastic plates and the thickness of the plates. As a result, the damper characteristics can be varied in the damper extension and compressions strokes.

In the damper 20 of variable damping force according to the first embodiment, the upper valve 55 is formed from a plate-shaped magnetic and elastic material having an arcuate slit 91 formed therein as shown in FIG. 3, but the upper valve 55 is not limited to this option alone. The slit may also have a polygonal shape, and a portion may be formed that is supported on the piston body, as may be a portion for opening and closing the ports.

Figure 7:
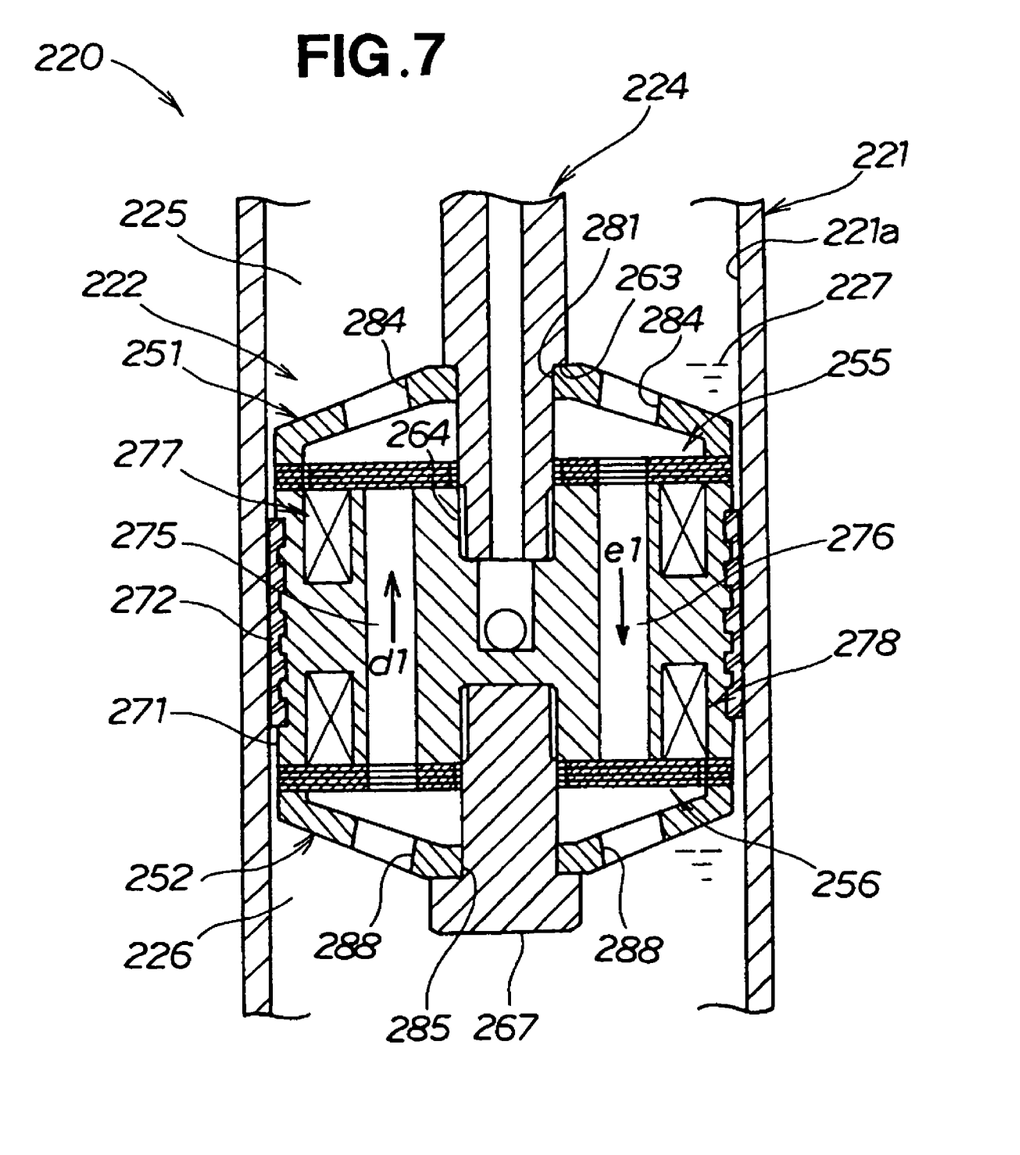
FIG. 7 is a cross-sectional view illustrating a damper of variable damping force according to a second embodiment of the present invention.

FIG. 7 shows a damper 220 of variable damping force according to the second embodiment.

Similar to the damper 20 of variable damping force according to the first embodiment, the damper 220 of variable damping force according to the second embodiment is composed of a tubular cylinder 221, a piston 222 that is slidably mounted within the cylinder 221 and that divides the cylinder 221 interior vertically into two chambers, a rod 224 that is attached to the piston 222 and that protrudes from one end of the cylinder 221 via a rod guide 23 (FIG. 1), and damper oil 227 that is hermetically sealed inside the cylinder 221 and that flows through the two chambers (upper chamber and lower chamber) 225, 226 via ports 275, 276, wherein the lower end of the damper is fixed to a suspension arm (not shown), and the upper end is fixed to a side of a vehicle body via an upper mount (not shown).

The piston 222 is composed of a piston body 271 attached to an external screw 264 of the rod 224, an upper pushing member 251 supported by a step 263 of the rod 224, an upper valve 255 that is supported by the upper pushing member 251 and the piston body 271 and that opens and closes a port 275 exclusively for a compressions stroke, a first electromagnetic solenoid (electromagnet) 277 provided to the piston body 271 for driving the upper valve 255, a lower pushing member 252 fixed to the piston body 271 by a bolt 267, a lower valve 256 that is supported by the lower pushing member 252 and the piston body 271 and that opens and closes a port 276 exclusively for an extension stroke, a second electromagnetic solenoid (electromagnet) 278 provided to the piston body 271 for driving the lower valve 256, and a seal member 272 that is attached to the external periphery of the piston body 271, that slides along an internal peripheral surface 221a of the cylinder 221, and that seals in the damper oil 227.

The upper and lower valves 255, 256 have the same configuration as the upper and lower valves 55, 56 of the first embodiment shown in FIGS. 3 and 4.

The upper pushing member 251 has a through-hole 281 through which the rod 224 runs, and a plurality of fluid holes 284 through which the damper oil 227 passes.

The lower pushing member 252 has a through-hole 285 through which the bolt 267 runs, and a plurality of fluid holes 288 through which the damper oil 227 passes.

In the damper compression stroke, the damper oil 227 flows from the lower chamber 226 into the upper chamber 225 as shown by the arrow d1. At this time, the upper valve 255 is driven by the first electromagnetic solenoid 277, whereby the damper characteristics are controlled in the compressions stroke.

In the damper extension stroke, the damper oil 227 flows from the upper chamber 225 into the lower chamber 226 as shown by the arrow e1. At this time, the lower valve 256 is driven by the second electromagnetic solenoid 278, whereby the damper characteristics are controlled in the extension stroke.

Specifically, in the damper 220 of variable damping force according to the second embodiment, the first and second electromagnetic solenoids 277, 278 for driving the valves 255, 256 are disposed in the interior of the piston 222 (on the piston body 271) exclusively for the damper extension stroke and the compressions stroke, respectively. Therefore, precise control is made possible when switching between the damper extension stroke and the compressions stroke.

Figure 8:
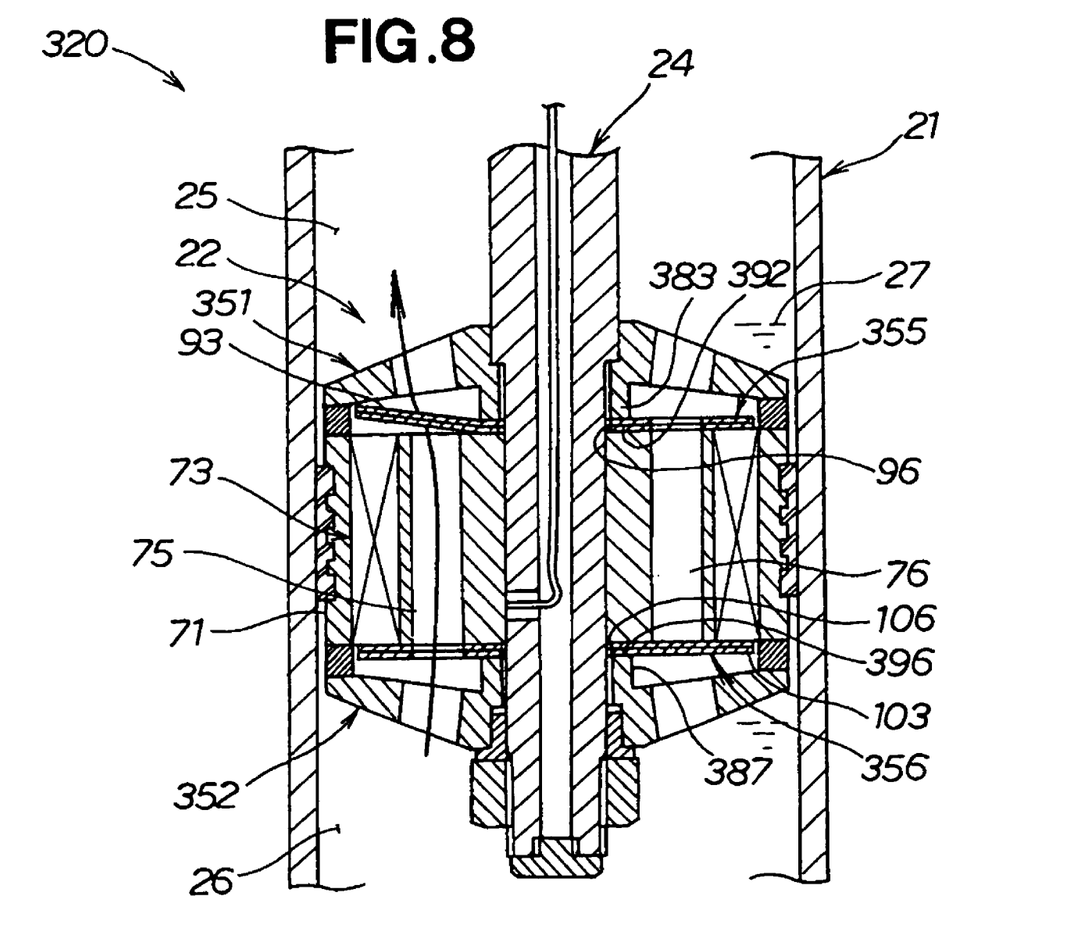
FIG. 8 is a cross-sectional view illustrating a damper of variable damping force according to a third embodiment of the present invention.

FIG. 8 shows a damper 320 of variable damping force according to the third embodiment. The damper 320 of variable damping force according to the third embodiment is different from the damper 20 of variable damping force according to the first embodiment in the shape of the upper pressing member, the thickness of the upper and lower valves, and also in that the upper and lower valves are supported at their centers, and other factors. Therefore, only the differences between these two embodiments will be described, and structural components similar to those of the first embodiment will be denoted by the same reference numerals and will not be described.

First, the upper and lower valves 355, 356 of the third embodiment have fewer stacked plates than the valves 55, 56 of the first embodiment; in other words, they are formed thinner.

In the upper valve 355, the periphery of a rod through-hole 96, which is in the center, is pushed against the piston body 71 by a pushing part 383 that protrudes downward from the bottom surface of an upper pushing member 351. In other words, the center of the upper valve 355 is held on both sides by the pushing part 383 and the piston body 71. The inner tongue part 93 thereby easily opens and closes the port 75.

In the lower valve 356, the periphery of a rod through-hole 106, which is in the center, is pushed against the piston body 71 by a pushing part 387 that protrudes upward from the top surface of a lower pushing member 352. In other words, the center of the lower valve 356 is held on both sides by the pushing part 387 and the piston body 71. The inner tongue part 103 thereby readily opens and closes the port 76.

In other words, in the damper 320 of variable damping force according to the third embodiment, since the supporting parts 392, 396 of the upper and lower valves 355, 356 are positioned in the center of the piston body 71, the valves 355, 356 can be easily supported on the piston body 71.

Figure 9A:
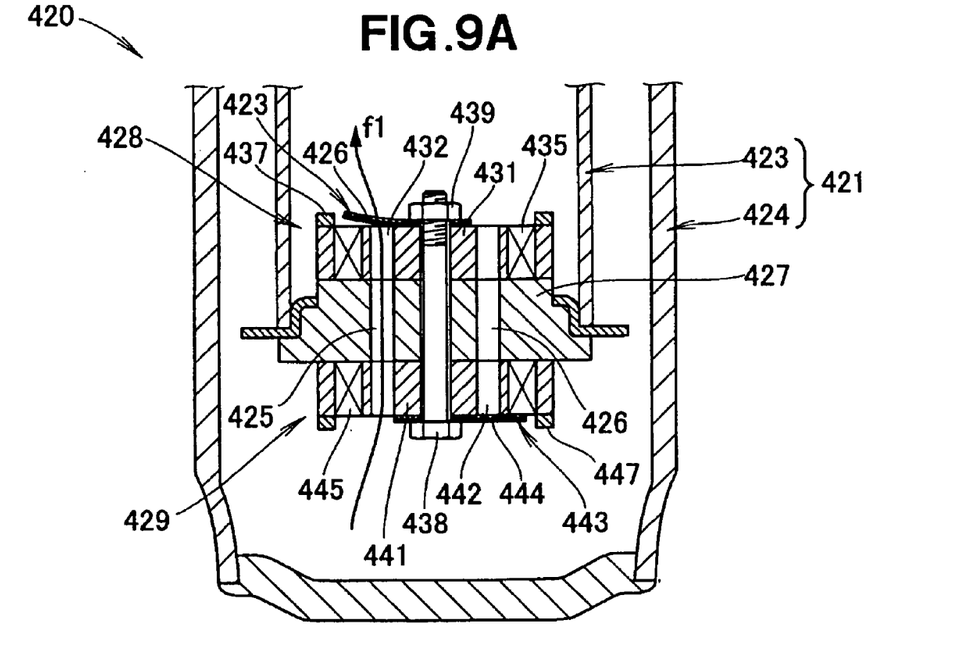
FIGS. 9A and 9B are cross-sectional views illustrating a damper of variable damping force according to a fourth embodiment of the present invention.
Figure 9B:
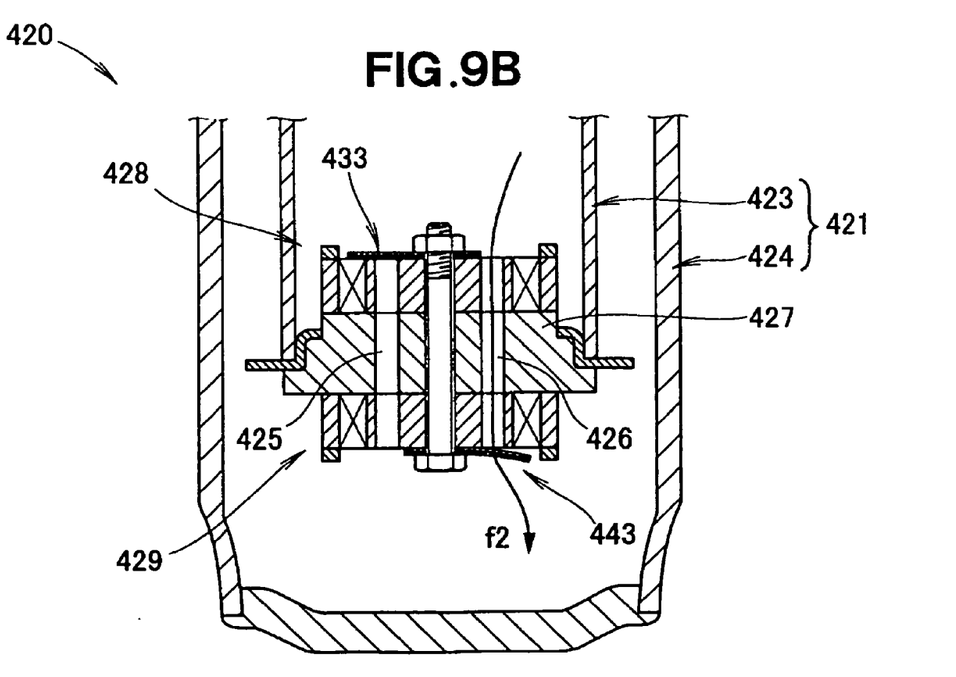

FIGS. 9A and 9B show a damper 420 of variable damping force according to the fourth embodiment.

The damper 420 of variable damping force according to the fourth embodiment is a multi-cylinder damper, and comprises a cylinder 421 composed of an inner cylinder 423 through which the piston (not shown) slides and an outer cylinder 424 provided coaxially with and on the external side of the inner cylinder 423; and upper and lower valve devices 428, 429 disposed in first and second communication ducts 425, 426 provided either at the end 427 of the inner cylinder 423 or between the inner cylinder 423 and the outer cylinder 424.

The upper valve device 428 is composed of a device frame 431 provided to the first communication duct 425, an upper valve 433 provided in a port 432 of the device frame 431, a first electromagnetic solenoid 435 provided to the device frame 431 for controlling the upper valve 433, and an upper magnetic flux delivery member 437 that is provided to the device frame 431, and that forms a magnetic circuit with the first electromagnetic solenoid 435 and delivers a magnetic flux to the upper valve 433 when an electric current is run through the first electromagnetic solenoid 435 while an opening/closing part 436 of the upper valve 433 is in an open state.

The upper valve device 428 is attached to the end 427 of the inner cylinder 423 by a bolt 438 and a nut 439.

The lower valve device 429 has the same configuration as the upper valve device 428. The reference numeral 441 denotes the frame, 442 denotes a port, 443 denotes a lower valve, 445 denotes a second electromagnetic solenoid, 446 denotes an opening/closing part of the lower valve 443, and 447 denotes a lower magnetic flux delivery member.

The lower valve device 429 is attached to the end 427 of the inner cylinder 423 by a bolt 438 and a nut 439.

When the upper valve device 428 is in the open state as shown in FIG. 9A, damper oil flows from the outer cylinder 424 into the inner cylinder 423 as shown by the arrow f1.

When the lower valve device 429 is in the open state as shown in FIG. 9B, damper oil flows from the inner cylinder 423 into the outer cylinder 424 as shown by the arrow f2.

Specifically, although the cylinder 421 is a multi-cylinder composed of the inner cylinder 423 through which the piston (not shown) slides and the outer cylinder 424 provided coaxially with and on the external side of the inner cylinder 423, the responsiveness of the upper and lower valves 433, 443 can be improved by placing the valves 433, 443 and the electromagnetic solenoids 435, 445 in the communication ducts 425, 426 provided either at the end 427 of the inner cylinder 423 or between the inner cylinder 423 and the outer cylinder 424.

In the damper 20 of variable damping force according to the first embodiment, the magnetic flux delivery members 53, 54 were supported on the sides of the upper and lower pressing members 51, 52, but the present invention is not limited solely to this arrangement, and the magnetic flux delivery members may also integrally extend from the piston. The same applies to the damper 320 of variable damping force according to the third embodiment.

The damper of variable damping force according to the present invention can be suitably used in a sedan, a station wagon, or another such passenger vehicle.

Obviously, various minor changes and modifications of the present invention are possible in light of the above teaching. It is therefore to be understood that within the scope of the appended claims the invention may be practiced otherwise than as specifically described.

What is claimed is:

1. A vehicle damper of variable damping force, comprising:
    a tubular cylinder for accommodating damper oil;
    a piston slidably housed in the cylinder and dividing the cylinder into two chambers;
    a pair of disk-shaped valves for controlling flow of the damper oil between the two chambers in correspondence with sliding movements of the piston; and
    an electromagnetic solenoid provided in the piston for open/close-driving the valves,
    wherein the valves have opening/closing parts for opening and closing a plurality of ports formed in the piston, and supporting parts for supporting the opening/closing parts in such a manner as to allow the opening/closing parts to make opening and closing actions, and
    wherein the opening/closing parts are disposed on a semi-circular opening/closing part side of each valve and the supporting parts are disposed on a semi-circular supporting part side of each valve with the opening/closing part side being disposed on opposite sides of a straight line passing diametrically across the piston, and
    wherein the supporting part side of each valve of the pair of valves includes an inflow hole aligned with one of the plurality of ports, and the opening/closing part of each valve is aligned with a different port from the port aligned with the inflow hole.

2. The damper of claim 1, wherein each of the valves is formed from a circular plate having a substantially same diameter as a diameter of the piston.

3. The damper of claim 2, wherein the valves are formed from an elastic material and have a respective arcuate slit formed along an external periphery of the circular plate, an annular part formed between the slit and an external peripheral edge of the plate and fixed to the piston, the opening/closing parts for open/closing the ports are formed on inner tongue parts which are located at portions farther radially inward than the arcuate slits, and the supporting parts are formed at portions where the inner tongue parts and the annular parts connect.

4. The damper of claim 1, wherein the valves are provided on respective ends of the piston for opening/closing the ports used exclusively for a damper extension stroke and a damper compression stroke, respectively.

5. The damper of claim 1, wherein the electromagnetic solenoid is provided internally of the piston so as to achieve both the damper extension stroke and damper compression stroke.

6. The damper of claim 1, wherein the valves are arranged in a diametrically opposing arrangement with the opening/closing part of each valve being aligned with a different port of the plurality of ports.

7. The damper of claim 1, wherein the valves are arranged in a diametrically opposing arrangement with the opening/closing part side of a first valve of the pair of disk-shaped valves being disposed on the same side of the straight line passing diametrically across the piston as the supporting part side of a second valve of the pair of disk-shaped valves.

8. A vehicle damper of variable damping force, comprising:
a tubular cylinder for accommodating damper oil;
a piston slidably housed in the cylinder for dividing the cylinder into two chambers;
disk-shaped valves disposed in a part of a flow duct through which damper oil flows in association with a sliding movement of the piston, for controlling the flow of the damper oil; and
an electromagnetic solenoid for driving the valves,
wherein the valves have opening/closing parts for opening and closing a plurality of ports formed in the piston, supporting parts for openably/closably supporting the opening/closing parts, and magnetic flux delivery members for forming a magnetic circuit with the electromagnetic solenoid when the electromagnetic solenoid is energized while the opening/closing parts are in an open state and for delivering a magnetic flux to the valves,
wherein the opening/closing parts are disposed on a semi-circular opening/closing part side of each valve and the supporting parts are disposed on a semi-circular supporting part side of each valve with the opening/closing part side being disposed on opposite sides of a straight line passing diametrically across the piston, and
wherein the supporting part side of each valve of the pair of valves includes an inflow hole aligned with one of the plurality of ports, and the opening/closing part of each valve is aligned with a different port from the port aligned with the inflow hole.

9. The damper of claim 8, wherein the valves and the electromagnetic solenoid are provided on the piston.

10. The damper of claim 8, wherein the cylinder comprises an inner cylinder in which the piston makes a sliding movement, and an outer cylinder disposed coaxially with and externally of the inner cylinder, and the valves and the electromagnetic solenoid are placed in communication ducts provided either at an end of the inner cylinder or between the inner cylinder and the outer cylinder.

11. The damper of claim 8, wherein the magnetic flux delivery members are positioned to confront opening/closing ends of the opening/closing parts when the opening/closing parts are in the open state.

12. The damper of claim 8, wherein the supporting parts are provided adjacent to an axial center of the piston.

13. The damper of claim 8, wherein the supporting parts are provided adjacent to an external periphery of the piston.

14. The damper of claim 8, wherein the valves are arranged in a diametrically opposing arrangement with the opening/closing part of each valve being aligned with a different port of the plurality of ports.

15. The damper of claim 8, wherein the valves are arranged in a diametrically opposing arrangement with the opening/closing part side of a first valve of the disk-shaped valves being disposed on the same side of the straight line passing diametrically across the piston as the supporting part side of a second valve of the disk-shaped valves.

* * * * *